United States Patent [19]

Vorona et al.

[11] 4,243,901
[45] Jan. 6, 1981

[54] EDDY CURRENT MACHINE BRAKE CONTROL DEVICE

[76] Inventors: Ilya I. Vorona, Voikovsky pereulok, 26, korpus 1, kv. 16; Rikhard A. Ioganson, Kutuzovsky prospekt, 4, kv. 6; Mark B. Perchenok, ulitsa Chasovaya, 27/12, kv. 16; Evgeny V. Chegodaev, ulitsa Novgorodskaya, 34, kv. 317; Valentin I. Chulin, ulitsa Novo-Petrovskaya, 18, kv. 49, all of Moscow, U.S.S.R.

[21] Appl. No.: 928,317

[22] Filed: Jul. 26, 1978

[30] Foreign Application Priority Data

Aug. 31, 1977 [SU] U.S.S.R. ............................ 2512801

[51] Int. Cl.$^3$ .............................................. H02K 49/04
[52] U.S. Cl. ........................................ 310/94; 310/93; 310/105
[58] Field of Search ................. 310/92, 93, 94, 105, 310/98, 96

[56] References Cited

U.S. PATENT DOCUMENTS 3,629,633  12/1971  O'Callaghan ........................ 310/94

FOREIGN PATENT DOCUMENTS 514399  2/1976  U.S.S.R. .

Primary Examiner—Donovan F. Duggan
Attorney, Agent, or Firm—Fleit & Jacobson

[57] ABSTRACT

According to the invention, the eddy current machine load control device comprises a comparator having a first input for the supply of voltage of a predetermined magnitude and a second input connected to an output of an electrical machine load transducer which is an actual value transducer intended to convert mechanical stresses to electric signals. The device further includes a threshold element, a diode and a proportional-integral-derivative voltage regulator having its input connected to an output of the comparator, whereas an output of said PID voltage regulator is coupled via the diode to a controlled input of a controlled power source of the electrical machine.

6 Claims, 2 Drawing Figures

EDDY CURRENT MACHINE BRAKE CONTROL DEVICE

FIELD OF THE INVENTION

The present invention relates to electrical machine control equipment and, more particularly, to an eddy current machine load control device.

The invention is chiefly applicable to the load control of electromagnetic brakes and sliding couplings employed in commercial installations which necessitate rapid changes of the braking moment, for example, in a plant for testing heat engines of transportation vehicles.

BACKGROUND OF THE INVENTION

All the known eddy current machine load control devices can only control the exciting current of an electrical machine. The braking moment of the machine lags behind the exciting current in time due to a considerable time constant of the eddy current circuit. As a result, the conventional devices, based on the eddy current control, are unable to effect a rapid change of the braking moment.

There is known an eddy current machine load control device (cf. USSR Inventor's Certificate No. 514,399, Cl. HO2K 49/02) comprising a comparator having a first input for the supply of voltage of a predetermined magnitude and an output electrically coupled via an automatic voltage regulator to a controlled input of a controlled power source of the electrical machine. An output of an electrical machine load transducer is connected to a second input of the comparator. The automatic voltage regulator is a proportional controller responding to the difference between the predetermined voltage and a feedback voltage at the output of the load transducer. The latter is a discrete transducer intended to convert the magnetic flux to an electric signal, and operates only at maximum or minimum magnitudes of the magnetic flux, which are proportional to minimum or maximum loads.

As a result, the device under review can only set a minimum or maximum load, being unable to automatically maintain the load at a prescribed level. Besides, a change in the operating conditions of the electrical machine necessitates modifications in the load transducer, which complicates the process of control.

SUMMARY OF THE INVENTION

It is an object of the present invention to increase the operating speed of the eddy current machine load control device.

It is another object of the invention to simplify the load control process.

This is attained by providing an eddy current machine load control device, comprising a comparator having a first input for the supply of voltage of a predetermined magnitude and an output electrically coupled via an automatic voltage regulator to a controlled input of a controlled power source of the electrical machine, and an electrical machine load transducer having its output connected to a second input of the comparator. The device is characterized, according to the invention, in that the automatic voltage regulator is a proportional-integral-derivative regulator, in that the load transducer is an actual value transducer intended to convert mechanical stresses to electric signals, and in that the device further includes a threshold element having its input connected to the output of the load transducer, and a diode interposed between an output of the automatic voltage regulator and the controlled input of the electrical machine's controlled power source, and shunted by a normally open contact of the threshold element.

The eddy current machine load control device according to the invention can automatically maintain the load at a prescribed level. In addition, it the invention renders unnecessary to make any modifications of the load transducer in the case of changes in the operating conditions of the electrical machine, and this simplifies the load control process and increases the operating speed of the device.

BRIEF DESCRIPTION OF THE ATTACHED DRAWINGS

Other objects and advantages of the present invention will become more apparent from the following detailed description of a preferred embodiment thereof, taken in conjunction with the accompanying drawings wherein.

DETAILED DESCRIPTION OF THE INVENTION

The invention will now be described in greater detail with reference to load control of an electromagnetic brake, taken as an example.

Figure 1:
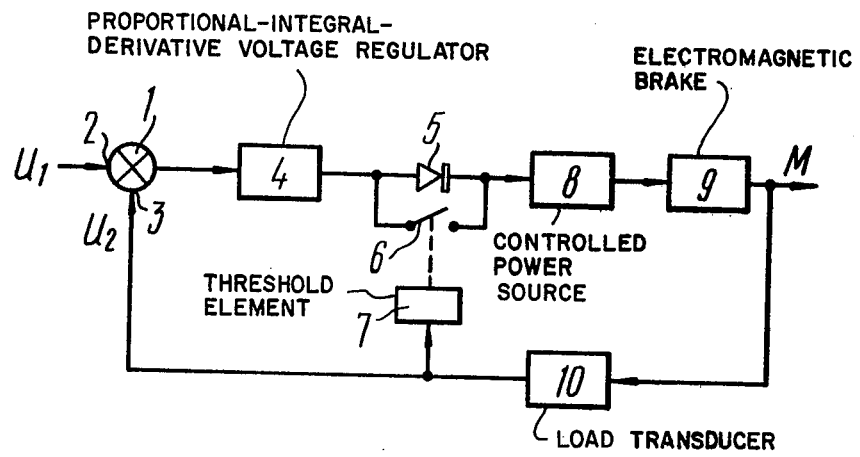
FIG. 1 is a block diagram of an eddy current machine load control device, in accordance with the invention.

According to the invention, the eddy current machine load control device comprises a comparator 1 (FIG. 1) having a first input 2 intended for the supply of voltage $U_1$ of a predetermined magnitude and a second input 3 intended for the supply of feedback voltage $U_2$. The device further includes a proportional-integral-derivative voltage regulator 4 having its input connected to an output of the comparator 1. An output of said voltage regulator 4 is electrically coupled, via a diode 5 which is shunted by a normally open contact 6 of a threshold element 7, to a controlled input of a controlled power source 8 of the excitation coil, intended to feed the exciting winding of an electromagnetic brake 9. Finally, the device includes a load transducer 10 which is a transducer of the actual braking moment value of the electromagnetic brake 9.

An output of the load transducer 10 is connected to an input of the threshold element 7 and to the second input 3 of the comparator 1.

Figure 2:
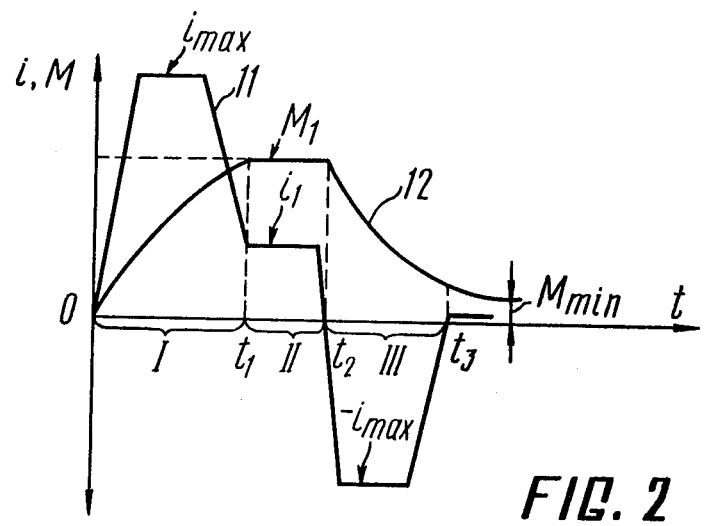
FIG. 2 shows time plots of parameters of an electrical machine under control, in accordance with the invention.

FIG. 2 presents time plots of electrical machine parameters. Curve 11 represents currents i of the exciting winding of the electromagnetic brake 9 (FIG. 1) against time t (FIG. 2). Curve 12 represents the braking moment M against time t.

The device for controlling the load of the electromagnetic brake 9 (FIG. 1) operates as follows.

Upon the arrival of a signal of voltage $U_1$ to increase the braking moment M, a signal of positive polarity is applied from the output of the voltage regulator 4 via the diode 5 to the controlled input of the controlled power source 8 of the electromagnetic brake 9. As a result, current i (FIG. 2, curve 11) of the exciting winding of the electromagnetic brake 9 increases over curve portion I to reach a maximum permissible level $i_{max}$, which ensures a desired intensified increase in the moment M (curve 12).

As a result, there is an increase in the signal feedback voltage $U_2$ (FIG. 2) at the output of the load transducer 10. As this signal reaches a magnitude close to that of the signal of voltage $U_1$ applied to the input 2 of the comparator 1, voltage at the output of the voltage regulator 4 is reduced to a level at which current $i_1$ (FIG. 2, curve 11, portion II) corresponds to the prescribed braking moment $M_1$.

The prescribed braking moment value $M_1$ is automatically maintained over portion II of curve 11 because the proportional-integral-derivative voltage regulator 4 (FIG. 1) responds to the deviation of the signal of voltage $U_2$, proportional to the actual value of the braking moment M, from the prescribed voltage $U_1$ applied to the first input 2 of the comparator 1.

If voltage $U_1$ is reduced to levels corresponding to braking moments $M \geq M_{min}$ (FIG. 2, curve 12, portion III) the control is carried out as described above.

A rapid decrease of the braking moment M is effected by a reversal of the controlled power source 8 (FIG. 1), for which purpose a signal of opposite polarity is applied from the output of the proportional-integral-derivative voltage regulator 4 via the closed contact 6 of the threshold element 7 to the input of said controlled power source 8.

With a reduction of the prescribed voltage $U_1$ to zero, the braking moment M may also be reduced to zero, whereas current i of the exciting winding is of negative polarity. With the negative polarity of current i of the exciting winding of the electromagnetic brake 9, there is an increase in the braking moment M, which may put the load control device out of action.

To preclude such a situation, the normally open contact 6 of the threshold element 7 is broken open as the braking moment M is reduced to a minimum permissible value $M_{min}$ (FIG. 2, curve 12). This eliminates the opposite polarity signal at the input of the controlled power source 8 (FIG. 1) of the electromagnetic brake 9 and thus reliably ensures a reduction in the braking moment M. The minimum permissible braking moment $M_{min}$ is set to be constant for all operating conditions.

Thus to switch from one mode of operation to another over the entire working range, one only has to alter the prescribed voltage $U_1$.

The device according to the invention can be used to advantage in a plant for testing eddy current machines and a plant for testing heat engines of transportation vehicles.

The device of this invention makes it possible to reduce the duration of costly field tests because it surpasses conventional control devices in the simulation of actual operating conditions.

The simplified electrical machine load control process and increased operating speed of the device account for a better efficiency of bench trials. As a result, trials require less personnel and are carried out faster than they used to be, which accounts for an increased service life of equipment subjected to trials.

The speeding up of bench trials helps to save fuel.

The automatic load control is more objective than it used to be, whereby trials yield fuller and more reliable information.

What is claimed is:

1. An eddy current machine load control device for controlling the load of an eddy current machine having a controlled power source, said device comprising:
    comparator means having a first input for the supply of voltage of a predetermined magnitude, a second input, and an output, for comparing said first input and said second input, and producing a comparison signal at said output when said first and second inputs are equal in magnitude;
    voltage regulator means responsive to said output of said comparator means for issuing an output controlling said controlled power source, and accordingly said eddy current machine, in accordance therewith, said eddy current machine producing an actual load value indicative of mechanical stresses therein;
    transducer means responsive to said actual load value of said eddy current machine for converting said mechanical stresses to an electrical signal output, and for providing said electrical signal output as said second input of said comparator means;
    diode means for providing said output of said voltage regulator means to said controlled power source when said output of said voltage regulator means has a first polarity, and for blocking said output of said voltage regulator means from said controlled power source when said output of said voltage regulator means has a second polarity;
    shunt means normally in an open circuit condition for blocking said output of said voltage regulator means from said controlled power source, and selectively actuable to a closed circuit condition for providing said output of said voltage regulator means to said controlled power source when said output of said voltage regulator means is of said second polarity; and
    threshold means responsive to said electrical output signal of said transducer means for selectively actuating said shunt means to said closed circuit condition so long as said braking moment of said eddy current machine is greater than a minimum moment value, and for selectively actuating said shunt means to said open circuit condition when said braking moment of said eddy current machine equals said minimum moment value.

2. The device of claim 1, wherein said voltage regulator means comprises a proportional-integral-derivative voltage regulator.

3. The device of claim 1, wherein said shunt means comprises a switch.

4. The device of claim 1, wherein said eddy current machine comprises an electromagnetic brake.

5. The device of claim 1, wherein said transducer means comprises a load transducer.

6. The device of claim 5, wherein said threshold means comprises a threshold element.

* * * * *